(12) United States Patent
Oblizajek et al.

(10) Patent No.: US 8,744,682 B2
(45) Date of Patent: Jun. 3, 2014

(54) REDUCING THE EFFECTS OF VIBRATIONS IN AN ELECTRIC POWER STEERING (EPS) SYSTEM

(75) Inventors: Kenneth L. Oblizajek, Troy, MI (US); John D. Sopoci, Commerce Township, MI (US); R. Larry Arbanas, Farmington Hills, MI (US); Lin Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1299 days.

(21) Appl. No.: 12/130,547

(22) Filed: May 30, 2008

(65) Prior Publication Data

US 2009/0294206 A1    Dec. 3, 2009

(51) Int. Cl.
| | |
|---|---|
| *A01B 69/00* | (2006.01) |
| *B62D 6/00* | (2006.01) |
| *B62D 11/00* | (2006.01) |
| *B62D 12/00* | (2006.01) |
| *B63G 8/20* | (2006.01) |
| *B63H 25/04* | (2006.01) |
| *G05D 1/00* | (2006.01) |
| *G06F 7/00* | (2006.01) |
| *G06F 17/00* | (2006.01) |
| *G06F 19/00* | (2011.01) |

(52) U.S. Cl.
USPC .............. 701/41; 180/412; 180/415; 180/443

(58) Field of Classification Search
USPC ............ 701/41; 180/400, 412, 415, 416, 421, 180/427, 428, 443, 446
See application file for complete search history.

(56) References Cited

U.S. PATENT DOCUMENTS

| | | | | |
|---|---|---|---|---|
| 4,885,722 | A * | 12/1989 | Leland | 367/25 |
| 5,473,231 | A * | 12/1995 | McLaughlin et al. | 318/433 |
| 5,504,403 | A * | 4/1996 | McLaughlin | 318/432 |
| 5,919,241 | A * | 7/1999 | Bolourchi et al. | 701/41 |
| 6,064,931 | A * | 5/2000 | Sawada et al. | 701/41 |
| 6,122,579 | A * | 9/2000 | Collier-Hallman et al. | 701/41 |
| 6,161,068 | A * | 12/2000 | Kurishige et al. | 701/41 |
| 6,263,738 | B1 * | 7/2001 | Hogle | 73/593 |
| 6,647,329 | B2 * | 11/2003 | Kleinau et al. | 701/41 |
| 6,681,883 | B2 * | 1/2004 | Loh et al. | 180/417 |
| 6,714,858 | B2 | 3/2004 | Oblizajek et al. | |
| 6,827,177 | B2 * | 12/2004 | Asada et al. | 180/446 |
| 6,999,862 | B2 * | 2/2006 | Tamaizumi et al. | 701/41 |
| 7,068,923 | B2 * | 6/2006 | Miyazaki | 388/806 |
| 7,079,929 | B2 * | 7/2006 | Sawada et al. | 701/41 |
| 7,604,088 | B2 * | 10/2009 | Nishizaki et al. | 180/446 |

(Continued)

FOREIGN PATENT DOCUMENTS

| | | | | |
|---|---|---|---|---|
| DE | 102005003180 A1 | 7/2006 | | |
| EP | 1502837 A1 * | 2/2005 | | B62D 5/04 |

(Continued)

*Primary Examiner* — Khoi Tran
*Assistant Examiner* — Jaime Figueroa
(74) *Attorney, Agent, or Firm* — Lionel D. Anderson; Reising Ethington P.C.

(57) ABSTRACT

The system and method described herein can be used to reduce the effects of periodic vibrations in an electric power steering (EPS) system for a vehicle, particularly, those that can lead to smooth road shake (SRS), torsional nibble, and/or other undesirable conditions. According to an exemplary embodiment, an electric motor is used to purposely generate counter-acting vibrations in the EPS system to cancel out the periodic vibrations generated by the wheel assemblies or corners.

19 Claims, 4 Drawing Sheets

(56) References Cited

U.S. PATENT DOCUMENTS

| | | | |
|---|---|---|---|
| 2001/0047233 A1* | 11/2001 | Kleinau et al. | 701/41 |
| 2002/0033300 A1* | 3/2002 | Takeuchi et al. | 180/446 |
| 2002/0056587 A1* | 5/2002 | Shibasaki et al. | 180/443 |
| 2002/0059824 A1* | 5/2002 | Ono et al. | 73/146 |
| 2003/0106736 A1* | 6/2003 | Kogiso et al. | 180/446 |
| 2004/0099471 A1* | 5/2004 | Asada et al. | 180/443 |
| 2004/0204812 A1* | 10/2004 | Tran | 701/80 |
| 2004/0245041 A1* | 12/2004 | Fukuda et al. | 180/444 |
| 2005/0027417 A1* | 2/2005 | Sawada et al. | 701/41 |
| 2005/0119810 A1* | 6/2005 | Kasbarian et al. | 701/36 |
| 2005/0182541 A1* | 8/2005 | Tamaizumi et al. | 701/41 |
| 2005/0274560 A1* | 12/2005 | Wakao et al. | 180/197 |
| 2006/0001392 A1* | 1/2006 | Ajima et al. | 318/432 |
| 2006/0180369 A1 | 8/2006 | Brosig et al. | |
| 2007/0107978 A1* | 5/2007 | Aoki et al. | 180/446 |
| 2007/0118262 A1* | 5/2007 | Nishizaki et al. | 701/41 |
| 2007/0198153 A1* | 8/2007 | Oya et al. | 701/41 |
| 2007/0201704 A1* | 8/2007 | Ishii et al. | 381/94.1 |
| 2007/0205041 A1* | 9/2007 | Nishizaki et al. | 180/446 |
| 2008/0001728 A1* | 1/2008 | Dufournier | 340/444 |
| 2008/0035411 A1* | 2/2008 | Yamashita et al. | 180/443 |
| 2008/0262678 A1* | 10/2008 | Nishimura et al. | 701/42 |
| 2008/0297077 A1* | 12/2008 | Kovudhikulrungsri et al. | 318/400.02 |
| 2009/0125186 A1* | 5/2009 | Recker et al. | 701/41 |
| 2011/0153162 A1* | 6/2011 | Kezobo et al. | 701/42 |

FOREIGN PATENT DOCUMENTS

| | | | |
|---|---|---|---|
| JP | 2006335228 A | * | 12/2006 |
| JP | 2007161006 A | * | 6/2007 |
| JP | 2009023582 A | * | 2/2009 |

* cited by examiner

REDUCING THE EFFECTS OF VIBRATIONS IN AN ELECTRIC POWER STEERING (EPS) SYSTEM

TECHNICAL FIELD

The present invention generally relates to an electric power steering (EPS) system for a vehicle and a method for use with the same. More particularly, the present invention relates to a system and method that can reduce or mitigate the effects of periodic vibrations in an EPS system.

BACKGROUND

There are numerous types of unwanted vibrations, noises, pulsations, disturbances, and other forms of fluctuating vibratory energy that can exist in a vehicle; these phenomena are hereafter collectively and broadly referred to as 'vibrations'. Vibrations can have many sources, including external sources such as irregular road surfaces, as well as internal sources.

An example of an internal source of vibrations is a non-concentric, out-of-round, or otherwise irregular rotating part. For instance, if a tire, wheel, hub and/or rotor is manufactured or mounted to the vehicle in a non-concentric or off-balance manner, then the part rotates with an uneven weight distribution. This, in turn, can produce periodic or harmonic vibrations in the vehicle; that is, vibrations having a first order component centered at a first order frequency, as well as higher- or multi-order components centered at frequencies that are integer multiples of the first order frequency. A first order component of a periodic vibration is generally centered at the same frequency as the rotating object from which it emanates and usually has a greater amplitude or intensity than its higher-order counterparts. For example, a wheel rotating at two rotations per second (2 Hz) can produce periodic vibrations having a first order component at 2 Hz, a second order component at 4 Hz, a third order component at 6 Hz, and so on. The first order or 2 Hz component is usually more intense than the second and third order components. It should be appreciated that non-concentric rotating parts are only one potential source of periodic vibrations in a vehicle, as many others also exist.

Periodic vibrations caused by internal sources can propagate throughout the vehicle and can cause an undesirable shake or movement of certain vehicle components that is noticeable to the driver. For instance, periodic vibrations generated at the wheel assemblies or corners can combine to create a dynamic torque on a steering wheel column component that causes the steering wheel to turn in either direction. When this type of event occurs on a flat or smooth road surface, it is all the more apparent to the driver and is sometimes referred to as 'smooth road shake' (SRS) or torsional nibble.

A variety of techniques for reducing or mitigating periodic vibrations in the vehicle have been employed. These techniques include on- and off-vehicle wheel balancing, using different types of damping components, and attempting to machine or otherwise produce more concentric and precise parts.

SUMMARY OF THE INVENTION

According to one embodiment, there is provided a method for use with an electric power steering (EPS) system. The method comprises the steps of: (a) measuring a vibration in a part of the EPS system; (b) identifying periodic content of the measured vibration; (c) determining a vibration correction from the periodic content; and (d) driving an electric motor according to the vibration correction.

According to another embodiment, there is provided an electric power steering (EPS) system for use with a vehicle. The EPS system comprises: a steering connection assembly; an electric motor coupled to the EPS system; and an electronic controller having a first input that receives a first signal from a sensor coupled to the steering connection assembly, a second input that receives a second signal from a sensor coupled to a wheel assembly, and an output that provides a command signal to the electric motor. The electronic controller uses the first and second signals to generate the command signal, and the command signal causes the electric motor to purposely introduce counter-acting vibrations into the steering connection assembly.

BRIEF DESCRIPTION OF THE DRAWINGS

Preferred exemplary embodiments of the invention will hereinafter be described in conjunction with the appended drawings, wherein like designations denote like elements, and wherein:

FIG. 3A shows the vibration signal over a single wheel revolution with significant background noise, FIG. 3B shows the vibration signal averaged over ten wheel revolutions, and FIG. 3C shows the vibration signal averaged over one hundred wheel revolutions; FIG. 4A shows the magnitude of the periodic vibrations, and FIG. 4B shows the phase of the periodic vibrations, relative to the angle of the respective rotating wheel assembly.

DETAILED DESCRIPTION OF THE PREFERRED EMBODIMENTS

The system and method described herein can be used to reduce the effects of periodic vibrations in an electric power steering (EPS) system, particularly, those that can lead to smooth road shake (SRS), torsional nibble, and/or other undesirable conditions. According to an exemplary embodiment, an electric motor is used to purposely generate counter-acting vibrations in the EPS system to cancel out the periodic vibrations generated by one or more wheel assemblies or corners.

Electric Power Steering System (EPS)—

Figure 1:
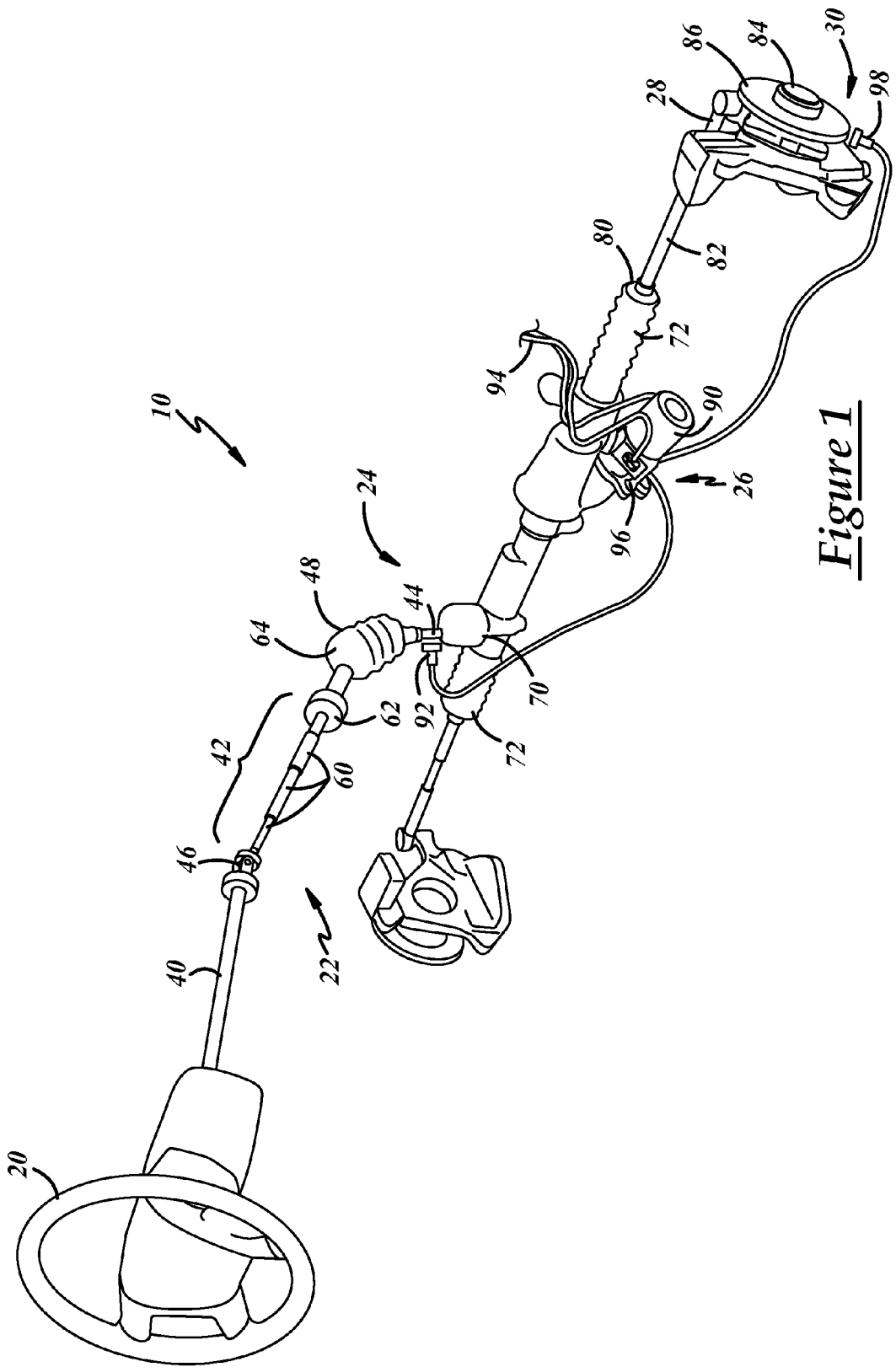
FIG. 1 is a perspective view of an exemplary electric power steering (EPS) system that can be used in a vehicle.

FIG. 1 is a perspective view of an exemplary electric power steering (EPS) system 10 which can be used to steer or control the front wheels of a motor vehicle. Although the EPS system 10 shown here is a 'rack-assist' type system (i.e., a system where the output of the EPS motor, through gearing, is coupled to a rack), it should be appreciated that the present system and method could be used with other types of EPS systems including, but not limited to, 'column-assist' and re-circulating ball type systems. According to this exemplary embodiment, EPS system 10 includes a steering wheel 20, a steering column assembly 22, a rack and pinion steering gear assembly 24, and a motor assembly 26, and it can be used in connection with a tie rod assembly 28 and a wheel assembly 30. These are, of course, only some of the components, devices, assemblies, systems, etc. that may be used with EPS system 10, as others known in the art could be used in lieu of or in addition to those mentioned here.

Steering wheel 20 is rotatably mounted on steering connection assembly 22 and provides a driver with the ability to steer the vehicle, as is widely appreciated in the art. Steering wheels can come in a variety of different forms and can carry additional components like a horn or electronic controls. For example, electronic controls that operate a cruise control system, a vehicle radio, and other known devices could be mounted to one or more branches or a center component of steering wheel 20. For purposes of simplicity, the wiring and different electrical connections that usually accompany a steering wheel and steering connection assembly have been removed from FIG. 1.

Steering connection assembly 22 rotatably supports steering wheel 20 and transmits the steering intentions of the driver to the other portions of EPS system 10. In the exemplary embodiment shown here, steering connection assembly 22 has been stripped of its exterior housing, control stalks, ignition components, etc. in order to reveal first, second, and third steering shafts 40, 42, 44, respectively, connected together by first and second steering joints 46, 48. Each of these exemplary parts are part of steering connection assembly 22. First steering shaft 40 is securely fastened to steering wheel 20 at an upper end and is coupled to second steering shaft 42 at a lower end via first steering joint 46. Although a number of different types of joints or connections can be used, first steering joint 46 is shown here as a universal joint (also called a U-joint, Cardan joint, Hardy-Spicer joint, Hooke's joint, etc.). Any type of joint that connects two rigid shafts together around a bend, and is able to transmit rotary motion from one shaft to the other could be used.

Second steering shaft 42 acts as an intermediary segment between the first and third steering shafts 40, 44 and is coupled to those shafts via steering joints 46, 48. It is possible for one or more of the steering shafts to include additional features, including a telescoping feature 60 that enables the shaft to extend to different lengths, as well as a rubber ring 62 for damping vibrations in the steering connection assembly. Second steering joint 48 is shown here encased in a plastic or rubber boot 64 that isolates or otherwise protects the steering joint located beneath. As with the first steering joint, second steering joint 48 can be one of a variety of different forms including a universal or swivel joint type. In this embodiment, third steering shaft 44 is shorter than the other shaft segments and acts as an input shaft to the rack and pinion steering gear assembly 24 (third steering shaft 44 is sometimes considered to be part of rack and pinion steering gear assembly 24, even though its illustratively shown here as part of steering connection assembly 22). It should of course be appreciated that the foregoing description is only of a general and exemplary nature as myriad steering connection assembly embodiments, including those having more, less and/or different components than that shown here, could also be used.

Rack and pinion steering gear assembly 24 converts rotational motion in steering connection assembly 22 into lateral or cross-vehicle motion that can be used to turn the vehicle's wheels. According to the embodiment shown in FIG. 1, a housing 70 encloses a cylindrical pinion gear, an elongated rack, one or more sets of bearings and other components widely known in the art (none of which are shown here). The pinion gear is arranged in a generally coaxial manner with third steering shaft 44 and includes geared teeth on its outer circumferential surface. The elongated rack is arranged according to a cross-vehicle orientation (i.e., the rack extends in the lateral direction of the vehicle) and has corresponding geared teeth to meshingly engage those of the pinion gear. Bearings and other components can be used to ensure smooth movement during operation. In this embodiment, flexible boots 72 are used to surround the sections of the rack that protrude from housing 70; this helps to ensure that the rack and pinion steering gear assembly is maintained free from dirt and debris. Each of the two ends of the rack (shown here inside of boot 72) connects to a rack joint 80, which can be a spherical or other omni-directional connection coupled to a tie rod inner 82 out to the end of the rack. The tie rod inner 82 connects with a tie rod outer, as will be explained. Other types of steering gear arrangements, for instance a re-circulating ball type arrangement, could be used instead.

Motor assembly 26 provides the system with power assist in order to supplement the manual steering force generated by the driver. This makes steering easier and more effortless. According to this particular embodiment, motor assembly 26 includes an electric motor 90, a sensor 92, a power input 94, electronic controller 96, and one or more gears, pulleys, belts, bearings, etc. for achieving preferred ratios of motor armature to rack velocities. Electric motor 90, which can be a brushless motor, brushed motor, or any other type of motor employed in the art, includes a motor output that can be mechanically coupled to the rack via a speed reduction mechanism (the motor generally rotates at too great of a rotational velocity for the rack, thus, it needs to be geared down). The electric motor can be powered via power input 94 so that it drives the rack in a lateral or cross-vehicle motion (the direction and speed is dependent on the motor control signals, as will be explained), which provides assistance for turning the wheels in addition to other functions.

Sensor 92 is coupled to one or more components of steering connection assembly 22 and provides a vibration signal to electronic controller 96. This sensor can be integrated or embedded within a component of steering connection assembly 22, rack and pinion steering gear assembly 24, or some other component of the EPS system 10, but one is depicted here externally for clarity. According to one possibility, sensor 92 is a torque sensor that is mounted at a location on the steering connection assembly 22 between steering wheel 20 and rack and pinion steering gear assembly 24, inclusive. In the exemplary embodiment of FIG. 1, sensor 92 is an existing torque sensor that is integrated within a section of third steering shaft 44 (input shaft to rack and pinion steering gear assembly 24) and measures a time-varying torque in the steering connection assembly. Put differently, sensor 92 can measure torque as a function of time so that changes due to periodic and/or aperiodic vibrations can be recorded for analysis. Skilled artisans will appreciate that various types of torque sensors or transducers could be used and that they can interact with one or more components of the steering connection assembly in a variety of ways. Some examples of suitable torque sensors include magnetostrictive-type sensors, rotational displacement-type sensors (e.g., sensors that measure a relative angular displacement with potentiometric devices or the like), and strain gauge-type sensors, to name but a few. It should be appreciated that sensor 92 does not have to be a torque sensor (a torque sensor may be preferable if it already exists in the steering connection assembly and thus is not an additional cost).

Any sensor capable of taking measurements that provide information on vibrations in steering connection assembly 22 could be used for sensor 92. In the example of a torque sensor, the measured torque is related to vibrations that can cause smooth road shake (SRS) and other undesirable phenomena. Other possible sensors include a steering angle sensor (the relative and/or absolute angular position of a steering connection assembly component could be related to vibrations therein), and an accelerometer (the displacement, velocity, and/or acceleration of a steering connection assembly component could be related to vibrations in the assembly). These are only some of the possible sensors that could be used, as others also exist. In any case, sensor 92 generates a vibration signal that can be sent to electronic controller 96, which can be any type of appropriate electronic control device, unit, module, etc. known in the art. In one embodiment, electronic controller 96 is a stand alone controller or module that includes a central processing unit (CPU), memory for storing data and instructions, a power amplifier for driving electric motor 90, and one or more connections to a vehicle CAN bus and/or other connections that enable intra-vehicle communication. It is also possible for electronic controller 96 to be integrated into a larger controller unit or module instead of being stand alone.

Tie rod assembly 28 connects the rack and pinion steering gear assembly 24 to the wheel assembly 30 so that lateral motion in the rack can be coupled to the wheels, thus, causing them to turn. According to this particular embodiment, a tie rod outer 82 connects with a tie rod inner, which in turn connects with a steering knuckle located on the wheel assembly. As is widely appreciated by those skilled in the art, tie rod assembly 28 works with both the steering and suspension systems of the vehicle, and helps facilitate control of the wheel or corner unit under a wide range of operating conditions. Additional features and devices, such as adjustable sleeves for changing the length of the tie rod and hence the 'toe' of the tires, are known and could be used.

Wheel assembly 30, also referred to as 'the corner', carries the vehicle's tires and includes a number of revolving components. In one embodiment, wheel assembly 30 includes a rotating hub 84, a rotating disk or rotor 86, and a wheel with an installed tire (not shown). All of these devices co-rotate when the vehicle is being driven, and speed up or slow down depending on the driving conditions. A disk brake system (not shown) can also be installed on the vehicle to interact with wheel assembly 30, although other braking systems like drum brakes could be used as well. One or more wheel sensors 98 could be used to determine the wheel speed, the relative angular position of the wheel, or some other variable.

In a conventional forward-driven operation, a driver exerts a rotational force on steering wheel 20 in order to turn it in a clockwise or counter-clockwise direction. The rotational force exerted by the driver is converted into a torque that is transmitted throughout the length of steering connection assembly 22. This torque can be sensed by torque sensor 92 at some location in the EPS system 10 and a corresponding signal is sent to electronic controller 96. The rotational motion of the various shafts, joints, etc. of steering connection assembly 22 is converted into a lateral or side-to-side motion in rack and pinion steering gear assembly 24. This conversion takes place between the pinion gear and the geared rack component, as is widely known in the art, and translates into lateral motion of tie rod inners 82 which move tie rod outers. The movement of the tie rods causes the wheel assemblies 30 to pivot or rotate in correspondence, which causes the vehicle's wheels to turn. In addition to this manual operation, motor assembly 26 also provides the driver with power assistance.

As previously mentioned, sensor 92 can provide a signal to electronic controller 96 that is representative of torque in the steering connection assembly. Electronic controller 96 can use the signal, a vehicle speed signal, and other inputs to generate a motor control signal which drives electric motor 90 in a certain direction, at a certain speed, for a certain amount of time. Mechanical output from electric motor 90 can be geared down through one or more components like pulleys, belts, gears, etc., and is converted into lateral motion that can be mechanically coupled to the rack. Thus, the total forces at the rack include the manual contributions from the driver and the electric contributions from electric motor 90. As previously mentioned, this is a so-called 'rack-assist' system because the output of electric motor 90 is mechanically coupled to the rack, however, other systems such as a 'column-assist' system could be used as well. In a column-assist system, the output of the motor is coupled to a component of steering connection assembly 22, such as first steering shaft 40.

The preceding paragraphs generally describe a forward-driven operation; that is, a steering operation that begins with the driver's manual input via a steering wheel and concludes with the wheels turning in response. It should be appreciated, however, that reverse-driven operations can also occur. Reverse-driven operations generally refer to situations where some type of excitation occurs at the wheel assemblies, and that excitation causes a corresponding vibration in one or more components of electric power steering (EPS) system 10. One example of a reverse-driven operation is the smooth road shake (SRS) previously described, where excitations at the corners cause periodic vibrations in the steering connection assembly which causes the steering wheel to turn. The method described below can address certain reverse-driven operations, including those that result in SRS.

Method for Use with an Electric Power Steering (EPS) System—

Figure 2:
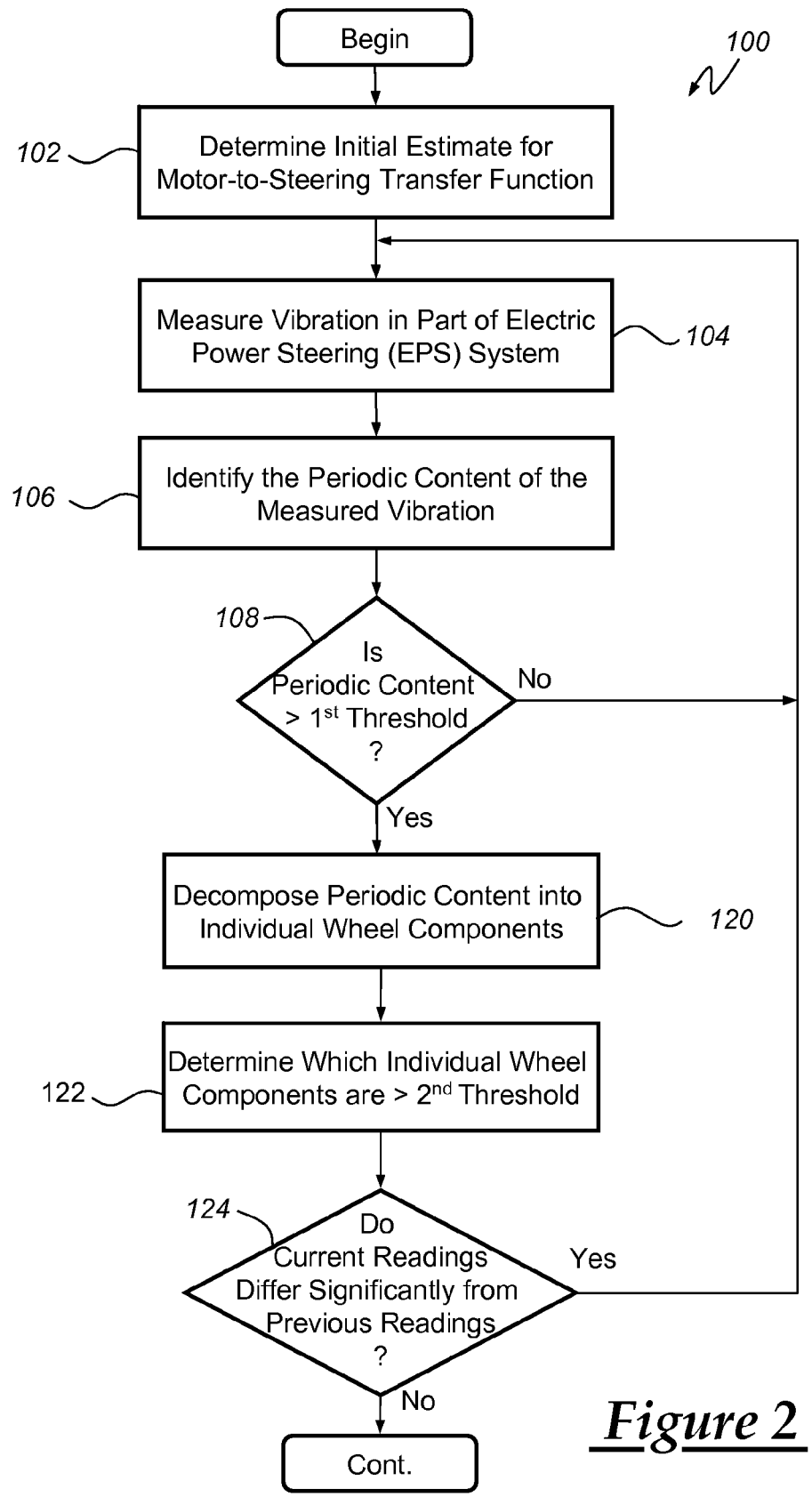
FIG. 2 is a flowchart illustrating some of the steps of an exemplary embodiment of a method for use with an EPS system.
Figure 2:
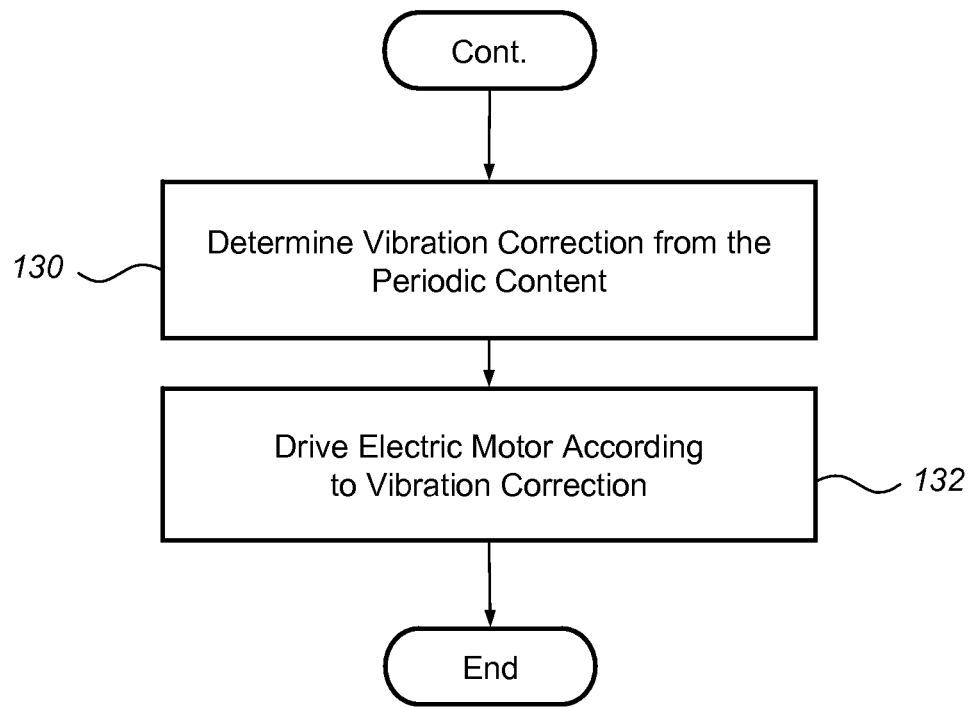

Turning to FIG. 2, there is shown a flowchart illustrating an exemplary embodiment 100 of a method that can be used with an electric power steering (EPS) system, such as that shown in FIG. 1.

Beginning with step 102, an initial estimate is determined for a 'motor-to-steering' transfer function, which generally describes the relationship between an input at electric motor 90 and a resulting vibration in one or more parts of steering connection assembly 22. More specifically, if electric motor 90 is driven with a certain amount of electrical current, then the motor-to-steering transfer function is representative of the response of the electrical current in a certain part of the steering connection assembly, such as the first, second or third steering shafts 40, 42, 44, for example. This effect can be measured by sensor 92 and, in the case where sensor 92 is a torque sensor, it can be measured as a time-varying torque acting upon a steering connection assembly component. Again, sensors other than torque sensors can be used. In this step, the motor-to-steering transfer function is an initial estimate because the method is assumed to be on its first or initial pass; thus, a learned motor-to-steering transfer function has not yet been empirically determined. The initial estimate could be a previously saved transfer function (e.g., from a previous pass), a default transfer function (e.g., one that was calculated in a lab and loaded on the vehicle during manufacturing), or some other transfer function known in the art. It should be appreciated that this is an optional step, as it is possible for method 100 to bypass this step and proceed directly to step 104 without producing an initial estimate of the motor-to-steering transfer function.

Next, a vibration is measured in some part of EPS system 10, step 104. The vibration can be measured in a variety of different parts or components, but according to an exemplary embodiment, it is measured in one of the steering shafts 40, 42, 44 that are located between steering wheel 20 and rack and pinion steering gear assembly 24. The vibration can be measured by sensor 92 and can be expressed as a time-varying vibration acting upon a steering component. Although the following description is provided in the context of a torque sensor that measures a time-varying torque in the steering connection assembly, it should be understood that any type of sensor capable of taking measurements that are proportional or otherwise related to vibrations could be used instead. Examples of other types of appropriate sensors are mentioned above. The measured vibration can include both periodic and aperiodic content, and can be expressed in a vibration signal that is sent from sensor 92 to electronic controller 96 for additional processing.

Figure 3A:
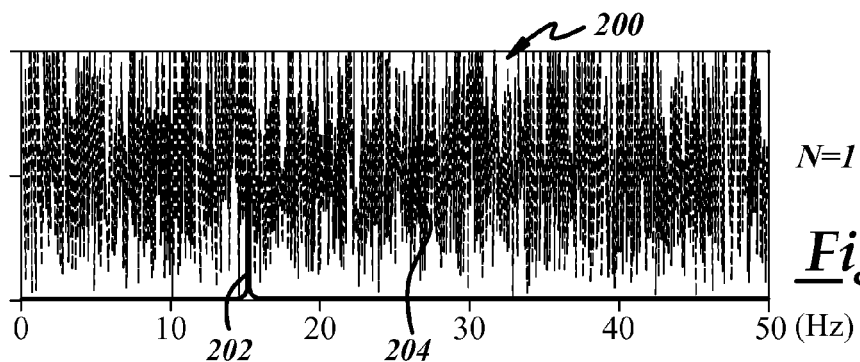
FIGS. 3A-C are spectral graphs showing both periodic and aperiodic content of an exemplary time-varying vibration signal, where
Figure 3B:
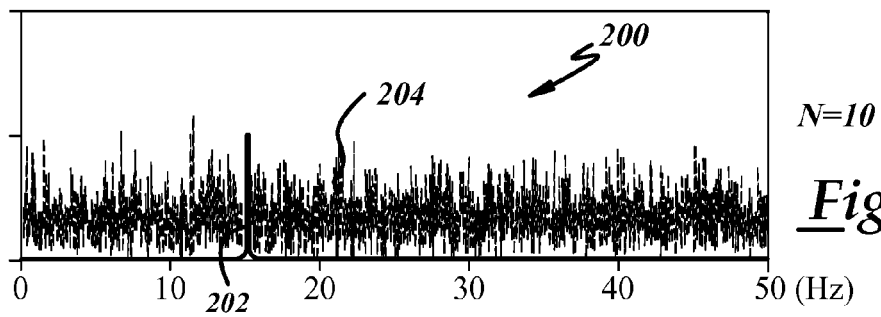
Figure 3C:
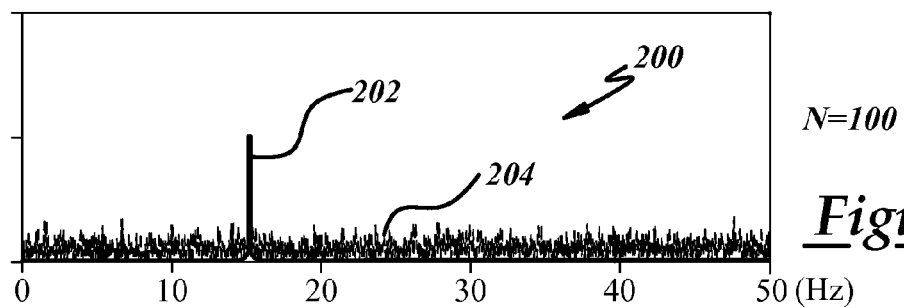

In step 106, the periodic content of the measured vibration is identified. A number of different techniques, including those based in the frequency or time domains, could be used to determine or extract the periodic content from the previously measured vibration. Some exemplary techniques that could be used include Fourier analysis, fast Fourier transforms (FFT), discrete Fourier transforms (DFT), wavelet analysis, and heterodyning, as is appreciated by skilled artisans. According to an exemplary embodiment, the time-varying vibration signal is averaged over a number of wheel revolutions. This generally causes the periodic content to stand apart from the aperiodic content, which averages down to levels approaching zero, as can be seen in FIGS. 3A-C. FIG. 3A shows the spectrum of a time-varying vibration signal 200 over a single wheel revolution (N=1), where signal 200 includes periodic content 202 surrounded by significant amounts of aperiodic content 204 (the aperiodic content could include vibrations coming from irregular road surfaces, electronic noise in the sensor, etc.). The periodic content 202 is centered at a frequency or rotational velocity of about 15 Hz for this example. In FIG. 3B, the time-varying vibration signal has been averaged over 10 wheel revolutions (N=10). It is clear that the amplitude of the aperiodic content 204 has decreased relative to the periodic content 202. Finally, in FIG. 3C, which is representative of the time-varying vibration signal being averaged over 100 wheel revolutions (N=100), the periodic content 202 noticeably stands out from the aperiodic content 204. Additional wheel revolutions and other signal processing techniques be used to further separate the periodic content from the aperiodic components.

According to an exemplary embodiment, Fourier transforms and/or other signal processing techniques can be performed over a limited range of frequencies. If the wheels are operating at essentially the same rotational velocity, then the amplitude of the periodic content can be measured over a limited frequency band (e.g., 1-5 Hz bandwidth) that is centered at the common rotational frequency of the wheels. For this calculation, wheel speed signals from each of the wheels, such as from sensor 98 or from a vehicle network, would be needed. In the example shown in FIGS. 3A-3C, a limited frequency band of 4 Hz could be centered on the 15 Hz frequency in order to create an analytical window spanning the 13-17 Hz range. This limited frequency band could improve the efficiency of step 106, as it could narrow in on the particular frequency band of interest and avoid having to process all of the other portions of the vibration signal.

The amplitude of spectrum 202 is generally representative of the overall periodic content from all of the wheels and is usually speed dependent. Stated differently, periodic content is centered at a frequency that is related to that of the rotating object from which it emanates, as already explained. By knowing the frequency or rotational velocity of the wheels or corners (i.e., the wheel speed signals), the present method can identify the periodic content that is created by the corners. If, on the other hand, the wheels are not operating at essentially the same rotational velocity, then separate amplitudes can be determined; one amplitude for each of the wheels, where each amplitude is measured over a limited frequency band (e.g., 1-5 Hz bandwidth) that is centered on the rotational velocity or frequency of that particular wheel. Once each of the amplitudes is determined, they are summed together.

Step 108 then compares the periodic content to a first threshold, also called a disturbance threshold. If the amplitude of the periodic content is not greater than the first threshold, then it is assumed that the periodic content is not significant enough to try and mitigate. In this case, control of the method passes back to step 104 so that vibrations in steering connection assembly 22 can continue to be measured and monitored. If, however, the periodic content calculated in the previous step has an amplitude or intensity that is greater than the first threshold, then the method can proceed with efforts to try and mitigate its effects or cancel it out. This threshold comparison can be performed in a variety of ways, including using peak amplitudes, average amplitudes, amplitudes of only the first order component, amplitudes of multi-order components, root mean square (rms), signal characteristics other than amplitudes, or according to some other technique know in the art. First order components typically constitute the largest and most intense constituents of the periodic content, followed by the second order component, third order component, and so on. Thus, it is possible to only determine the first order component of the periodic content and to ignore some of the higher-order components in an effort to simplify some of the signal processing tasks involved. Of course, any combination of first, second, third order components, etc. could be used.

In an exemplary embodiment, the rms (root mean square) of the periodic content taken over a brief period of time (e.g., 1-16 sec, inclusive) is compared against a first threshold having a value that is equivalent to about 60-100 mg rms, inclusive, taken at the radius of steering wheel 22 (tangential steering wheel acceleration). In some instances, the first threshold is equivalent to about 80 mg rms. The unit 'mg' represents thousandths of a 'g', which is generally the average acceleration produced by gravity at the Earth's surface or 9.806 m/s$^2$. Empirical testing has shown that it takes about 60-100 mg rms of tangential acceleration in steering wheel assembly 20 to produce undesirable conditions such as SRS. Thus, the first threshold used in this example is generally equivalent to that value (relationships between acceleration, the inertial impedance of the steering wheel, torque, etc. can be used for conversion of units). Of course, the first threshold could be expressed in other units, including torque, as explained above. The comparison being performed in step 108 generally involves periodic content from multiple wheel assemblies or corners, but generally does not include aperiodic contributions from irregularities in the road surface and other external sources.

Next, step 120 decomposes the periodic content of the measured vibrations into one or more individual wheel components. Put differently, step 120 breaks down the periodic content of the measured vibration on a wheel-by-wheel basis so that the individual contributions from each wheel assembly or corner can be realized. It is possible to only break down the first order component of the periodic content in order to simplify the data processing, however, multi-order components could be broken down as well. In order to identify the individual wheel components, other information may be needed such as information on the relative and/or absolute position of each wheel. A wheel position signal can be provided by the same wheel speed sensor 98 that provides the wheel speed signals mentioned above, or it can be provided by a separate sensor. In an exemplary embodiment, the wheel speed signal is a 48 pulse per revolution (ppr) signal, and the wheel position signal is a 1 ppr signal that provides information indicative of the relative and/or absolute position of each wheel. One or both of these signals may be provided by sensors that already exist in the vehicle, such as those in a standard antilock braking system (ABS).

Figure 4A:
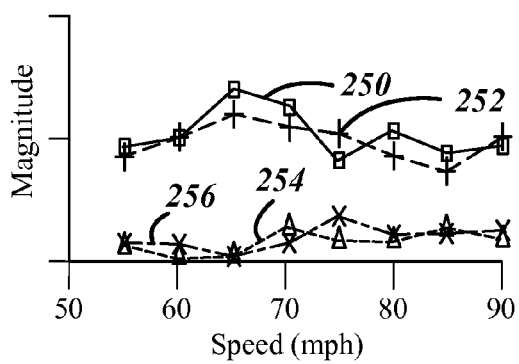
FIGS. 4A-B are graphs showing exemplary periodic vibrations, as measured by the sensor, broken down into contributions from each of the wheel assemblies, where
Figure 4B:
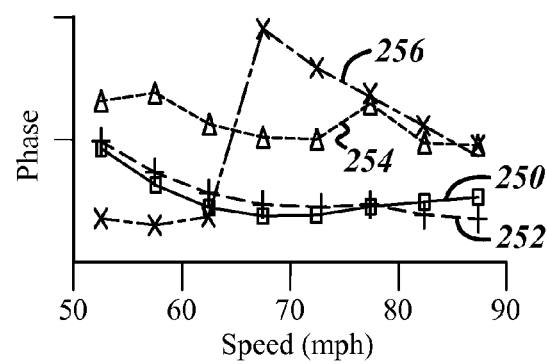

Turning to FIGS. 4A-B, there are shown two graphs that illustrate a breakdown of the periodic vibrations into the contributions from each of the four wheel assemblies or corners. More specifically, FIG. 4A shows the magnitudes of periodic vibrations in a steering wheel with a torque sensor like that of sensor 92, while FIG. 4B shows the phases of the periodic vibrations. In both graphs periodic vibrations (both magnitude and phase) are plotted against vehicle speed, and a first plot 250 is representative of the left-front corner contribution, 252 is representative of the right-front corner contribution, 254 is representative of the left-rear corner contribution, and plot 256 is representative of the right-rear corner contribution. Typically, the front wheel assemblies or corners produce more periodic vibrations in the EPS system 10 than the rear corners because they are physically coupled to the system via tie rod assemblies 28. This additional mechanical coupling can transmit vibrations from the corners to steering connection assembly 22, as demonstrated in FIG. 4A. FIG. 4B demonstrates the phase relative to the angle of the respective wheel assembly as it rotates; this is plotted for our four corners using the same number designations as in FIG. 4A. A variety of techniques could be used to decompose the periodic content into one or more individual wheel components, including the following.

One possible method for determining the contributions from the different wheel assemblies or corners is described in U.S. Pat. No. 6,714,858 (hereafter the "'858 patent"), which is assigned to the present assignee and is incorporated herein by reference. The methods and techniques disclosed in this patent are particularly well suited for situations when all significantly participative vehicle wheels are rotating at approximately the same rotational velocity. For instances where the wheels are rotating at different rotational velocities, some modifications to the method disclosed in the '858 patent may be appropriate.

For example, with respect to Equation 1 of the '858 patent, it states that one can use phasor quantities of the first order component to populate the X matrix. This approach is particularly appropriate when there is approximately one frequency for the first order components of all corners. If there is a significant difference in the rotational velocities or frequencies of the corners (e.g., a difference that is greater than the resolution frequency), then the '858 patent method may be modified as it relates to the population of the matrices. In one embodiment of the '858 patent, the time signals for each of the corner pulse trains, and the response channel, are split into windows, put through a Fourier transform, and the complex quantities representing the signal content at the first order frequency are loaded into the X matrix (and Y matrix for the response channel). The '858 patent also mentions the use of "Lines," which are the signal contents at frequencies neighboring the first order frequency. They are included to account for any spreading of the signal over more than one frequency which occurs because of the method used to sample and window the signal. The total number of rows in the X and Y matrices will be equal to the number of windows into which the original time signal was split multiplied by the number of frequency bands, or Lines, to be used in each window. If it is found that the rotational velocities or frequencies of two or more corners are separated by one or more frequency Lines, then the analysis may be enhanced by including the first order Lines of all the corners along with any neighboring Lines needed to account for computational spreading. Again, it should be appreciated that the '858 method and the modified '858 method described above are only two possible techniques that could be used to decompose or break the periodic vibrations into individual contributions from each of the corners. Other techniques known to those skilled in the art could be used as well.

Now that the individual wheel components have been extracted from the periodic content, step 122 determines which of those components are significant enough to try and address. In an exemplary embodiment, each of the contributions from the individual wheels is compared to a second threshold and if it is greater than the second threshold, then a vibration correction is determined for that individual wheel component. Using the first threshold example above where 60-100 mg rms is used for the periodic content from the wheel assemblies, a second threshold having a value equivalent to 15-25 mg rms could be used here (60-100 mg rms/4 corners=15-25 mg rms). More specifically, a second threshold value of about 20 mg rms could be used. To illustrate, assume that the front left-side wheel contributes 25 mg rms to the overall periodic content. Step 122 could determine that this contribution exceeds a second threshold value of 20 mg rms and is significant enough to try and mitigate with a vibration correction. On the other hand, if the rear right-side wheel only contributes 12 mg rms, which is less than the exemplary second threshold, then this individual wheel component could be deemed not significant enough to try and correct. It should be appreciated that a single second threshold value could be used (i.e., one for all the wheel assemblies), or different thresholds could be used for the front versus rear wheels, left versus right wheels, etc. The techniques mentioned above for comparing periodic content to a first threshold could be used here as well.

At this point, an optional step 124 can be performed where the present readings for individual wheel components are compared to previously saved readings associated with the same wheel. Such a comparison can be helpful to identify large or unexpected changes in vibrations emanating from an individual wheel. For example, assume that during a previous execution of method 100, the front right-side wheel exhibited 12 mg rms of periodic content, but during the next execution of the method the same wheel exhibited 25 mg rms of periodic content. This is a substantial change to occur between successive passes of the method. Step 124 could also compare phases to determine if the two readings are within a certain phase of one another (vibration readings are oftentimes saved as phasors (complex quantities) having both magnitude and phase components). Thus, step 124 can compare the present and past wheel components and if the two readings differ from one another by a certain degree, then the method can return to step 104 to get confirmation that the readings are indeed correct. Step 124 could also use certain discrepancies between the readings to identify consequences of changes to the corners such as physical changing of tire(s), wheel(s), brake rotor(s), loss of balance weight(s) and modify the adaptive methods advantageously. Step 124 could also use certain discrepancies between the readings to identify part malfunctions or other undesirable conditions; e.g., a large and significant change in an individual wheel component could signify a flat tire. Again, this step is only optional, as it could be omitted in part or all together.

Step 130 then determines a vibration correction from the periodic content previously identified. A 'vibration correction' includes any data, signal, command, electric voltage or current, or any other information that can be used to drive an electric motor such that it purposely introduces vibrations into one or more components of an electric power steering (EPS) system. In an exemplary embodiment, step 130 uses a motor-to-steering transfer function (e.g., the motor-to-steering transfer function initially estimated in step 102) to determine a plurality of vibration corrections; one for each individual wheel component that exceeded the second threshold in step 122. Of course, a transfer function other than the one initially estimated in step 102 could be used; for example, a motor-to-steering transfer function used in the last pass or a combination of the most recent passes through the method could be used. Generally, each vibration correction is a negative function of the individual wheel component to which it pertains. This way, the introduction of a single vibration correction into EPS system 10 cancels out a corresponding individual wheel component generated by a specific wheel assembly. The different vibration corrections can be added together, summed, or otherwise combined so that electric motor 90 is driven with a single command signal.

The following description pertains to one exemplary embodiment for performing step 130, and it determines a vibration correction using the following equations. It should be appreciated that other techniques for determining a vibration correction that cancels out or otherwise reduces some measured vibration in an EPS system could be used instead, as the following embodiment is only one possibility.

$$SWT_n = X_n \cdot ACF_n \quad \text{(Equation 1)}$$

$$\text{(Vector 1)} \; SWT = \begin{bmatrix} SWT_{L_1} \\ SWT_{L_2} \\ SWT_{L_3} \\ \vdots \\ SWT_{L_m} \end{bmatrix}$$

$$\text{(Matrix 1)} \; X = \begin{bmatrix} x_{L_1,LF} & x_{L_1,RF} & x_{L_1,LR} & x_{L_1,RR} \\ x_{L_2,LF} & x_{L_2,RF} & x_{L_2,LR} & x_{L_2,RR} \\ x_{L_3,LF} & x_{L_3,RF} & x_{L_3,LR} & x_{L_3,RR} \\ \vdots & \vdots & \vdots & \vdots \\ x_{L_m,LF} & x_{L_m,RF} & x_{L_m,LR} & x_{L_m,RR} \end{bmatrix}$$

$$\text{(Vector 2)} \; ACF = \begin{bmatrix} acf_{LF} \\ acf_{RF} \\ acf_{LR} \\ acf_{RR} \end{bmatrix}$$

Equation 1 is a general equation where SWT is an m×1 vector of phasors (complex quantities) that represents the measured vibration sensed by sensor 92 (in this example, the vibration is measured in units of torque), X is an m×4 matrix of phasors (this assumes that all four corners are used, if more or less corners are used the size of this matrix could change) that includes terms from individual and combinations of absolute wheel position signals coming from sensors such as sensor 98 (in this example, the absolute wheel position signal is the 1 ppr signal described above), and ACF is a 4×1 vector of phasors that represents a corner-to-steering accountability for each of the corners or wheel assemblies (e.g., $acf_{LF}$, $acf_{RF}$, $acf_{LR}$, $acf_{RR}$). The subscript n denotes the present iteration of the analysis loop, and the subscript m denotes the number of elements in the data sample, as discussed earlier. The subscript L denotes the index of the phasor from the Fourier transform of a signal for a specific window/frequency band. Because X is an m×4 matrix and ACF is a 4×1 vector, it is assumed in this example that all four corners are being used. This method could also be used with only two corners (e.g., LF and RF), in which case X would become an m×2 matrix, and ACF would become a 2×1 vector, for example.

Next, Equation 2 is used, where the symbol (*) denotes a complex conjugate operation (term by term), and (') denotes a transpose of a matrix or vector. An initial corner-to-steering accountability ACF for each of the wheel assemblies can now be determined using the measured vibrations SWT and the absolute wheel position signals X, which can be transformed and normalized.

$$ACF_n = [X^*_n \cdot X_n]^{-1} \cdot X^*_n \cdot SWT_n \quad \text{(Equation 2)}$$

Equation 3 can now be used to calculate a new or accumulated corner-to-steering accountability that takes into account the SWT values just calculated, as well as previously calculated SWT values. By doing so, Equation 3 can reduce the effects of sudden changes in the corresponding accountabilities and acts as an averaging technique of sorts. This calculation can be omitted in some cases where it is desirable to simply use the most recently calculated corner-to-steering accountability. This can also be achieved by using a large value of µ (as µ→∞, the averaging is disabled and operations depend on the most recent data samples; this may also be true for subsequent uses of p with various subscripts). In Equation 3, $AccumAcf_n$ represents an accumulated or weight averaged corner-to-steering accountability, $acf_n$ is representative of the recently calculated corner-to-steering accountability, and $\mu_A$ is a weighting function. This calculation to determine AccumAcf can be performed for each of the corners.

$$AccumAcf_{corner_n} = \frac{AccumAcf_{corner_{n-1}} + \mu_{corner_A} \cdot acf_{corner_n}}{1 + \mu_{corner_A}} \quad \text{(Equation 3)}$$

In one embodiment, the weighting constant $\mu_A$ is a function of several variables (see Equation 4), including the last calculated AccumAcf, the recently calculated acf, and a vehicle smooth road shake (SRS) sensitivity value SHy (e.g., measured along the lateral axis with a sensor mounted on the steering wheel at the twelve o'clock position and preprogrammed at the factory using knowledge of typical vehicle model sensitivity performance). Other weighting constants could be used instead.

$$\mu_{corner_A} = f(AccumAcf_{corner_{n-1}}, acf_{corner_n}, acf_{corner_{n-1}}, SHy, \ldots) \quad \text{(Equation 4)}$$

Next, Equation 5 relates electrical input to a motor, such as electrical motor 90, to vibrations measured in EPS system 10. In this equation, H is a phasor (complex scalar quantity) that is representative of a motor-to-steering transfer function, and I is a phasor (complex scalar quantity) that is representative of motor current signals. The initial $H_{corner}$ and $AccumH_{corner}$ can be equal to each other and set to a reasonable value depending on the EPS motor, steering system, steering column, steering wheel and suspension used at the factory. The $H_{corner}$ can then be recalculated on each iteration, per equation 6. The initial $I_{corner}$ is set to zero, yielding $I_{corner} = 0$ for the first step, and $I_{corner\,0} = 0$ and $I_{corner\,I} = 0$.

$$\Delta acf_{corner}|_{n-1}{}^n = H_{corner_n} \cdot \Delta I_{corner}|_{n-1}{}^n \quad \text{(Equation 5)}$$

The terms with 'Δ' are phasor differences between the current and previous steps.

Solving for H yields Equation 6, which determines a motor-to-steering transfer function for each of the corners. The ΔI value should be monitored to make sure that it is not too small for estimating the transfer function.

$$H_{corner_n} = \frac{\Delta acf_{corner}|_{n-1}^{n}}{\Delta I_{corner}|_{n-1}^{n}} \qquad \text{(Equation 6)}$$

Equation 6 can permit individual motor-to-steering transfer functions for each of the corners. For vehicles demonstrating quasi-linear responses regardless of corner accountability and motor drive current, the transfer functions will converge to a single common transfer function, H, and will not be specific to an individual corner. Some evidence for this condition is the practical simplification and reduction of the individual motor-to-steering transfer functions to an effective common phasor quantity regardless of corner. Such information may be obtained by testing representative vehicles throughout the early development cycle of the model, or by observing field performance by extracting these transfer functions from vehicles in use.

This exemplary process can then use Equation 7 to update an accumulated motor-to-steering transfer function AccumH using the last known accumulated motor-to-steering transfer function, the recently calculated motor-to-steering transfer function, and a weighting constant $\mu_{corner H}$. This weighting or averaging technique is similar to that employed in Equation 3 and previously described.

$$AccumH_{corner_n} = \frac{AccumH_{corner_{n-1}} + \mu_{corner_H} \cdot H_{corner_n}}{1 + \mu_{corner_H}} \qquad \text{(Equation 7)}$$

Weighting function $\mu_{corner H}$ can be a function of several variables and can be calculated by using the present acf and previous acf for that particular corner, the incremental change in drive current to the motor for the corner $\Delta I_{corner}$, the frequency freq of that corner, and a vehicle smooth road shake (SRS) sensitivity value SHy.

$$\mu_{corner_H} = f(acf_{corner_n}, acf_{corner_{n-1}}, \Delta I_{corner}|_{n-1}^n, \text{freq}_{corner}, SHy, \ldots) \qquad \text{(Equation 8)}$$

By accumulating the effects of the vibration correction, the method can empirically determine a new motor-to-steering transfer function that is likely more accurate than the one initially used. An empirically determined transfer function can be more preferable than an estimated one for a variety of reasons. One such reason is that myriad factors, including the dynamics of the electric power steering (EPS) system, operating conditions of the vehicle, wear of parts, etc., can affect the transfer function over time. Thus, an input to electric motor 90 may have a certain response in steering connection assembly 22 one day, and have a different response a week, month, or year later.

Equation 9 can then be used to calculate a new motor current phasor (complex scalar quantity) I for each corner. In this exemplary approach, the new motor current phasor I can be determined by using the last motor current phasor, the present acf the new motor-to-steering transfer function H, and another weighting function $\mu_{corner I}$. The weighting function $\mu_{corner I}$ is a function of the response of the electric motor 90, among other variables; see Equation 10.

$$I_{corner_{n+1}} = I_{corner_n} - \mu_{corner_I} \frac{AccumAcf_{corner_n}}{AccumH_{corner_n}} \qquad \text{(Equation 9)}$$

$$\mu_{corner_I} = f(H, AccumH, I, \Delta I, acf_{corner}, \ldots) \qquad \text{(Equation 10)}$$

Now that motor current phasors I, which are vibration corrections, have been determined for each of the corners, step 132 drives an electric motor according to the vibration correction so that it mitigates the effects of the measured vibrations. The vibration correction can be in one of a number of different forms. If the vibration correction is in the form of a command signal, then electronic controller 96 or some other electronic processing device could be used to process the command signal and help convert it into actual electrical current used to drive or operate electric motor 90. If the correction is in the form of the actual electrical current used to drive electric motor 90, then this driving current can be applied directly or indirectly to the motor. It should be appreciated that there are numerous ways to drive electric motors synchronously with the corners and that any suitable ways known in the art could be used here. One such method uses the multi-pulse wheel signal(s) to incrementally update the dynamic and periodic motor drive signals.

In some embodiments, step 130 may not attempt to correct or fully cancel out all of the periodic content in the steering connection assembly 22 at one time. For example, if the system were to fully compensate and stimulate the steering connection assembly with too great of corrective vibrations, then this sizeable correction could become too apparent to the driver. Instead, when step 130 is developing the vibration corrections, it can generate them in a manner so that each correction is only a percentage or fraction of an otherwise full correction. For instance, if the front left-side wheel is generating an individual wheel component that has a peak amplitude of 20 mg rms, then step 130 could generate a vibration correction having a peak amplitude of only 5 mg rms. This more gradual approach assumes that the 20 mg rms component can be cancelled out within several iterations or rounds of vibration corrections.

The phasor quantities, H and acf, are typically functions of frequency or speed; therefore, the exemplary methods provided above that involve equations and results (e.g., the accumulated and weighted averages) should be conducted at discrete speeds. The opportunity to acquire information at these discrete speeds may depend on the operation of the vehicle by the driver, where infrequent use at some speeds may necessitate application of approximating quantities for immediate vibration suppression. In these cases, interpolations between previously acquired and stored values may be advantageous for performing cancellation. Many interpolation techniques are possible including linear, quadratic, modal-fitted with limited degrees-of-freedom, as well as others known to the skilled artisan. In addition, while acquiring information during normal operation of the vehicle, changes in vehicle speed may result in dithering conditions at nominal speeds and also contribute to variations in the expected phasor quantities. Those skilled in the art will likewise appreciate that implementation of imposed limits on allowable dithering of speed over which the data is acquired, averaged and stored can sometimes be helpful.

The method just described can have certain adaptive qualities that enable it to adapt or learn as it proceeds. As is appreciated by those skilled in the art, this adaptive nature is inherent to some of the exemplary steps provided above, particularly those that are used in an iterative fashion. By using an adaptive approach, the present method can take into account changes in the vibratory nature of the vehicle, the assemblies, the individual parts, etc., and may result in a more flexible and robust approach to addressing unwanted periodic vibrations.

It is to be understood that the foregoing description is not a definition of the invention, but is a description of one or more preferred exemplary embodiments of the invention. The invention is not limited to the particular embodiment(s) disclosed herein, but rather is defined solely by the claims below. For example, the method shown in FIGS. 2A-B could include a combination of steps that differs from the exemplary method described above. Such an alternative could include a combination where one or more steps have been removed, one or more steps have been added, and/or one or more steps have been substituted for other steps known to those skilled in the art, to cite just a few possibilities. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for use with an electric power steering (EPS) system, comprising the steps of:
   (a) measuring a vibration in a part of the EPS system, wherein the measured vibration includes periodic and non-periodic content and is measured by a sensor coupled to the part of the EPS system being vibrated;
   (b) identifying the periodic content of the measured vibration by evaluating the measured vibration over a number of wheel revolutions and extracting the periodic content from the non-periodic content of the measured vibration;
   (c) determining a vibration correction from the periodic content extracted from the non-periodic content of the measured vibration; and
   (d) driving an electric motor according to the vibration correction, wherein the vibration correction mitigates the effect of the measured vibration.

2. The method of claim 1, wherein step (a) further comprises measuring the vibration in a steering shaft of the EPS system, wherein the steering shaft is an input shaft to a rack and pinion steering gear assembly.

3. The method of claim 2, wherein step (a) further comprises measuring the vibration in the steering shaft with a torque sensor, wherein the measured vibration is a time-varying torque acting upon the steering shaft.

4. The method of claim 1, wherein step (b) further comprises comparing the periodic content to a first threshold, if the periodic content is greater than the first threshold then performing step (c).

5. The method of claim 4, wherein the first threshold has a value that is equivalent to 60-100 mg rms, inclusive, of tangential steering wheel acceleration.

6. The method of claim 4, wherein the periodic content is measured over a limited frequency band that is between 1-5 Hz, inclusive, and is centered at a rotational velocity of one or more wheels.

7. The method of claim 1, wherein step (b) further comprises determining a first order component of the periodic content and ignoring one or more higher-order components of the periodic content.

8. The method of claim 1, wherein step (b) further comprises identifying the periodic content of the measured vibration and decomposing the periodic content into one or more individual wheel components that correspond to individual wheel assemblies.

9. The method of claim 8, wherein if all of the individual wheel assemblies are rotating at substantially the same rotational velocity, then decomposing the periodic content into one or more individual wheel component further comprises populating a matrix with phasor quantities at or near a single frequency.

10. The method of claim 8, wherein if some of the individual wheel assemblies are rotating at different rotational velocities, then decomposing the periodic content into one or more individual wheel component further comprises populating a matrix with phasor quantities at or near multiple frequencies.

11. The method of claim 8, wherein step (b) further comprises comparing each of the individual wheel components to a second threshold, if an individual wheel component is greater than the second threshold then performing step (c) for that individual wheel component.

12. The method of claim 11, wherein the second threshold has a value that is equivalent to 15-25 mg rms, inclusive, of tangential steering wheel acceleration.

13. The method of claim 8, wherein step (b) further comprises comparing each of the individual wheel components to a previously saved component that is associated with the same wheel assembly, and if the two components differ by a certain degree then step (a) is repeated before performing step (c).

14. The method of claim 8, wherein step (c) further comprises determining a plurality of vibration corrections, and each of the vibration corrections is related to a negative function of a corresponding individual wheel component.

15. The method of claim 1, wherein step (d) further comprises driving an electric motor according to the vibration correction, wherein the vibration correction uses a multi-pulse wheel signal to incrementally update periodic motor drive signals.

16. The method of claim 1, further comprising the step of:
   measuring an additional vibration in the same part of the EPS system while driving the electric motor in step (d), and identifying those portions of the additional vibration that are attributable to the vibration correction.

17. The method of claim 16, further comprising the step of:
   determining a motor-to-steering transfer function based on those portions of the additional vibration that are attributable to the vibration correction, and modifying the vibration correction based on the motor-to-steering transfer function.

18. An electric power steering (EPS) system for use with a vehicle, comprising:
   a steering connection assembly;

an electric motor being coupled to the EPS system to provide power assistance to supplement a manual steering force; and an electronic controller having a first input that receives a first signal representative of a measured vibration from a sensor coupled to the steering connection assembly, a second input that receives a second signal from a sensor coupled to a wheel assembly, and an output that provides a command signal to the electric motor, wherein the electronic controller is configured to use the first and second signals to identify periodic content of the measured vibration and to use the periodic content to generate the command signal, and the command signal causes the electric motor to purposely introduce counter-acting vibrations into the EPS system that mitigate the effects of the periodic content of the measured vibration.

19. A method for use with an electric power steering (EPS) system, comprising the steps of:

(a) measuring a vibration in a part of the EPS system, wherein the measured vibration includes periodic and non-periodic content;

(b) processing the measured vibration over a number of wheel revolutions so that the periodic content of the measured vibration stands apart from the non-periodic content of the measured vibration;

(c) decomposing the periodic content of the measured vibration into one or more individual wheel component(s);

(d) using the one or more individual wheel component(s) to determine one or more vibration correction(s); and (e) driving an electric motor according to the one or more vibration correction(s), wherein the vibration correction(s) mitigate the effect of the measured vibration.

* * * * *